United States Patent [19]

Osato

[11] Patent Number: 4,792,942
[45] Date of Patent: Dec. 20, 1988

[54] METHOD AND APPARATUS FOR MULTI-DESTINATION COMMUNICATION PROCESSING IN PACKET STORAGE/EXCHANGE NODE

[75] Inventor: Tatsuo Osato, Tokyo, Japan
[73] Assignee: Hitachi, Limited, Tokyo, Japan
[21] Appl. No.: 668
[22] Filed: Jan. 6, 1987

[30] Foreign Application Priority Data

Jan. 7, 1986 [JP] Japan .................................. 61-1086

[51] Int. Cl.⁴ .......................................... H04Q 11/04
[52] U.S. Cl. ......................................... 370/60; 370/62
[58] Field of Search ...................... 370/60, 58, 62, 94; 379/230, 240

[56] References Cited

U.S. PATENT DOCUMENTS 4,055,728 10/1977 Lyan-Caen et al. .................. 370/58
4,253,179 2/1981 Shimizu .................................. 370/67
4,370,742 1/1983 Minamitani et al. .................. 370/58

FOREIGN PATENT DOCUMENTS 58-204660 11/1983 Japan .

Primary Examiner—A. D. Pellinen
Assistant Examiner—Geoffrey S. Evans
Attorney, Agent, or Firm—Kenyon & Kenyon

[57] ABSTRACT

In a method and an apparatus for multi-destination communication processing in a packet storage/exchange node, a line control module controls transmission and reception of a message that contains either a single destination message or a multi-destination message to and from a telephone subscriber line. A file storage stores the message in accordance with delivery destination addresses, and a file control module controls writing the message received from the line control module into the file storage and reading the message from the file storage to supply the message to the line control module. At least one multi-destination message tempeorary storage area of a multi-destination message temporary storage included in a multi-destination message storing/processing module temporarily stores a multi-destination message and at least one single destination message storage area of the multi-destination message temporary storage stores individual single destination messages expanded from the multi-destination message.

7 Claims, 10 Drawing Sheets

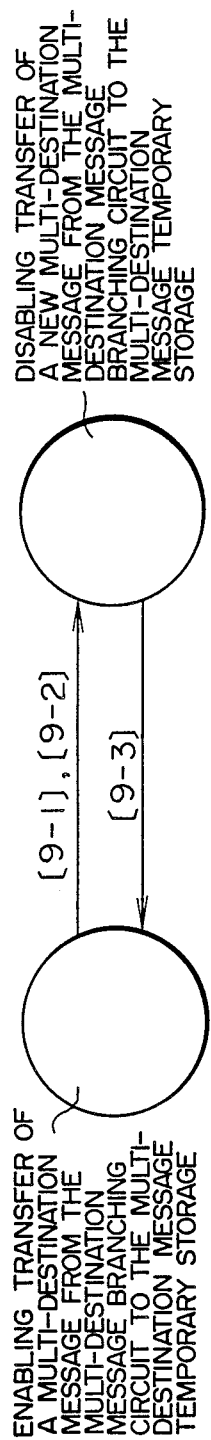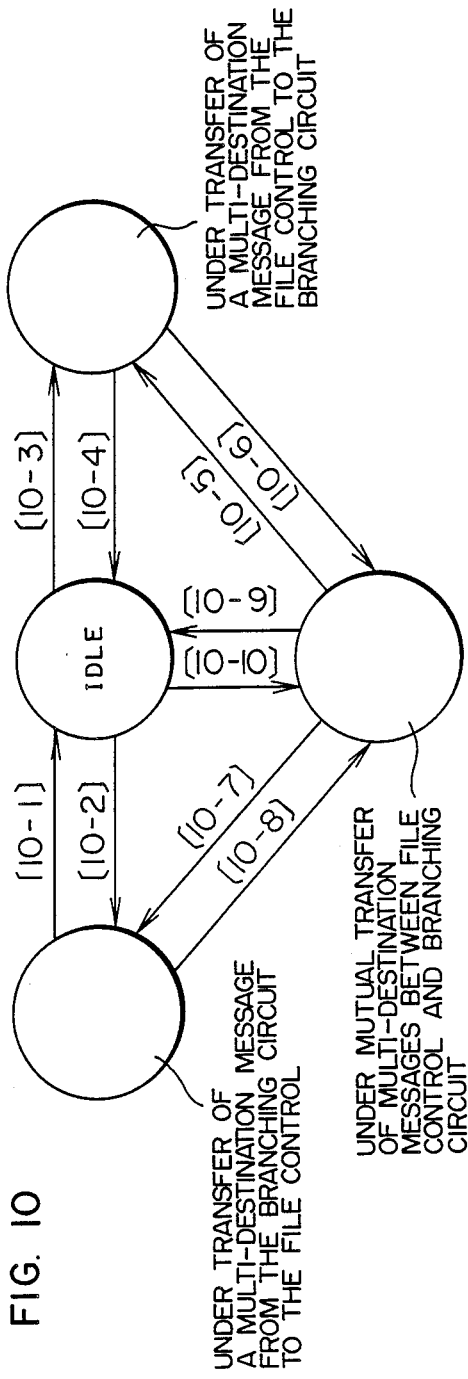

METHOD AND APPARATUS FOR MULTI-DESTINATION COMMUNICATION PROCESSING IN PACKET STORAGE/EXCHANGE NODE

BACKGROUND OF THE INVENTION

This invention relates generally to packet storage/exchange nodes and more particularly to a multi-destination communication processing system in a packet storage/exchange node. The invention is suitable for excluding an abrupt increase in load on multi-destination message expansion processing and avoids mutual interference at message input and output of a subscriber circuit due to a bottleneck in node performance.

The term "terminal" is a general term indicative of packet exchange terminals such as computers, facsimile terminals and the like. The term "node" is a general term indicative of network elements having a packet exchange function.

A prior art packet storage/exchange node is generally constructed as shown in FIG. 1. Referring to FIG. 1, a line control module 1 controls transmission and reception of a message in the form of a packet to and from a telephone line such as a telephone subscriber line or telephone trunk line 10. A file control module 2 stores a message from the line control module 1 into a predetermined area of a file storage 3 and reads a message from the file storage 3 to supply the read message to the line control module 1. The file storage 3 stores messages in correspondence to individual single destination deliveries.

In designing such a packet storage/exchange node with a view of meeting an increase in load on the file control module, it has hitherto been practice to increase the number of file control modules involved correspondingly to thereby promote the capability of the node in total. This expedient is exemplified in FIG. 2 wherein a plurality of file control modules 2-1, 2-2 and 2-3 are provided.

With multi-destination message services introduced into the packet storage/exchange node, however, the load on the file control module is theoretically increased in proportion to $(n-1)$ when the number of subscriber terminals associated with the node is n and the prior art system faces difficulties in complying with the increasing load. Consequently, there arises a problem that a multi-destination message from one of the subscribers interferes with communications in progress between the node and an other subscriber, causing a bottleneck in the file control module processing.

This will be detailed with reference to FIGS. 3A-3C. As illustrated in FIG. 3A the preformance of the file control module 2 is set to be such that the load factor typically measures 100% when n subscribers access the node at a time. Under multi-destination message services, multi-destination message expansion is required to be undertaken at the entrance to the file control module 2. As will be seen from FIG. 3B one multi-destination message for the total (n) deliveries issued from one subscriber occupies $(n-1)/1 \times 100\%$ of the load factor of the file control module. Likewise, as illustrated in FIG. 3C, multi-destination messages for the total deliveries issued from n subscribers will load $n \times (n-1)/n \times 100 = (n-1) \times 100\%$ of the file control module's load factor upon the file control module 2. As a result, the node experiences, in its file control module, such a bottleneck as is liable to force the file control module to continue occupying the CPU at an activity ratio of about 100%, followed by stoppage of processings of lower priority grade or to fill up the input/output buffer to make the same inoperable. This means that the node becomes overloaded instantaneously.

Reference may be made to JP-A-58-204660, for example, as a relevant reference to multi-destination communications.

SUMMARY OF THE INVENTION

This invention contemplates avoidance of a bottleneck that can occur in the file control module of known systems when a plurality of multi-destination messages develop at a time in a packet storage/exchange. Such a bottleneck might otherwise adversely affect the CPU or the input/output buffer associated with the file control module to seriously degrade the performance of the node or to render the node inoperable. It is an object of this invention to provide a method and an apparatus for multi-destination communication processing capable of excluding inter-circuit interference which occurs between every available circuit and the node, the interference being, for example, disconnection of subscriber lines due to time-out.

To accomplish the above object, according to this invention, a multi-destination message storing/processing module has a multi-destination message temporary storage. A header in a message received from a telephone subscriber line is read and analyzed at a line control module. When the input message is detected to be a multi-destination message, this multi-destination message is transferred to the multi-destination message temporary storage at which it is temporarily stored and expanded into individual single destination delivery messages which in turn are transferred sequentially in units of one message to a file control module, thereby releasing the file control module from being loaded for multi-destination message expansion. During the multi-destination message expansion, the line control module deals with a transmission request from that telephone subscriber line by holding the request (keeping it pending) or making no response to the request.

BRIEF DESCRIPTION OF THE DRAWINGS

FIGS. 7 to 12 illustrate, with the aid of diagrammatic representation and table, operational states and operational events in multi-destination message branching circuit, multi-destination message temporary storage, file control module and subscriber circuit.

DETAILED DESCRIPTION

The invention will now be described by way of example with reference to the accompanying drawings.

Figure 1:
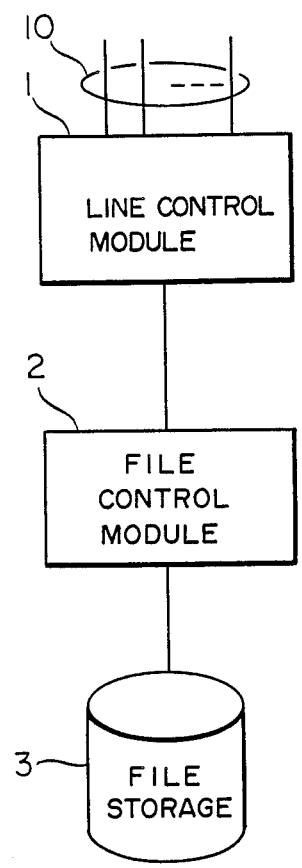
FIGS. 1 and 2 are schematic diagrams showing prior art packet storage/exchange nodes.
Figure 2:
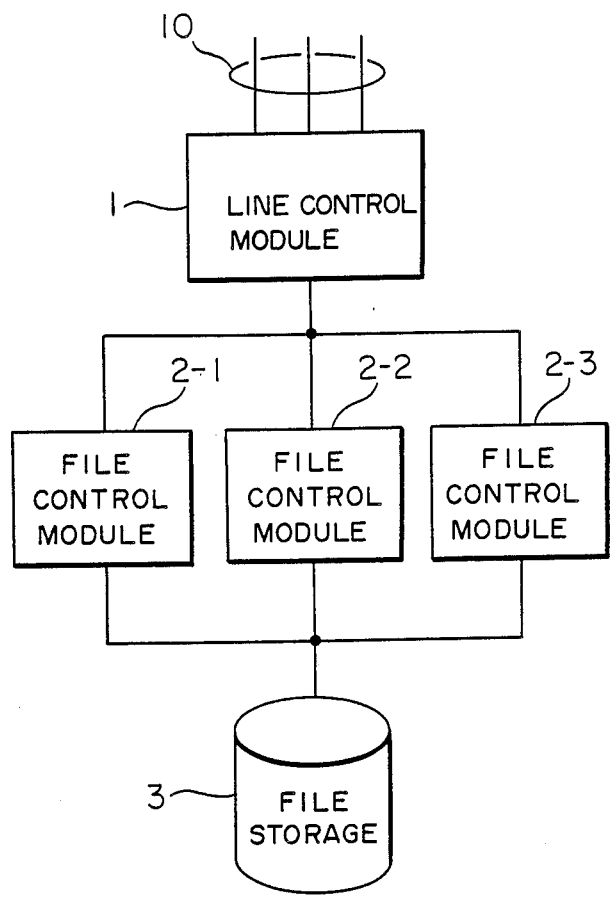
Figure 3A:
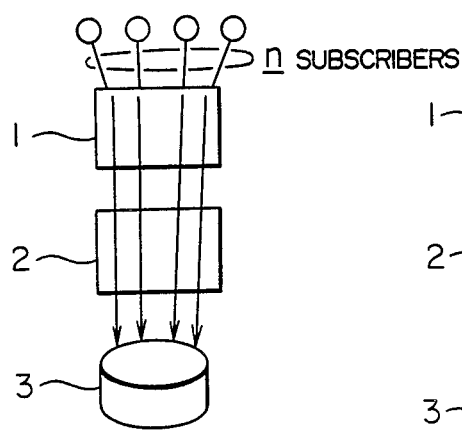
FIGS. 3A to 3C illustrates problems encountered in the prior art systems.
Figure 3B:
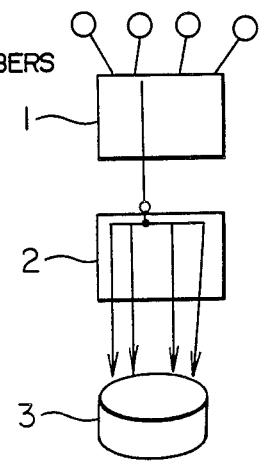
Figure 3C:
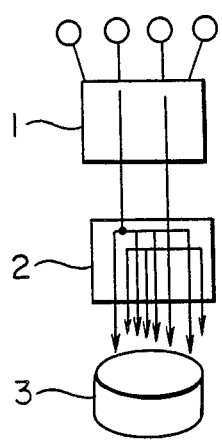
Figure 4:
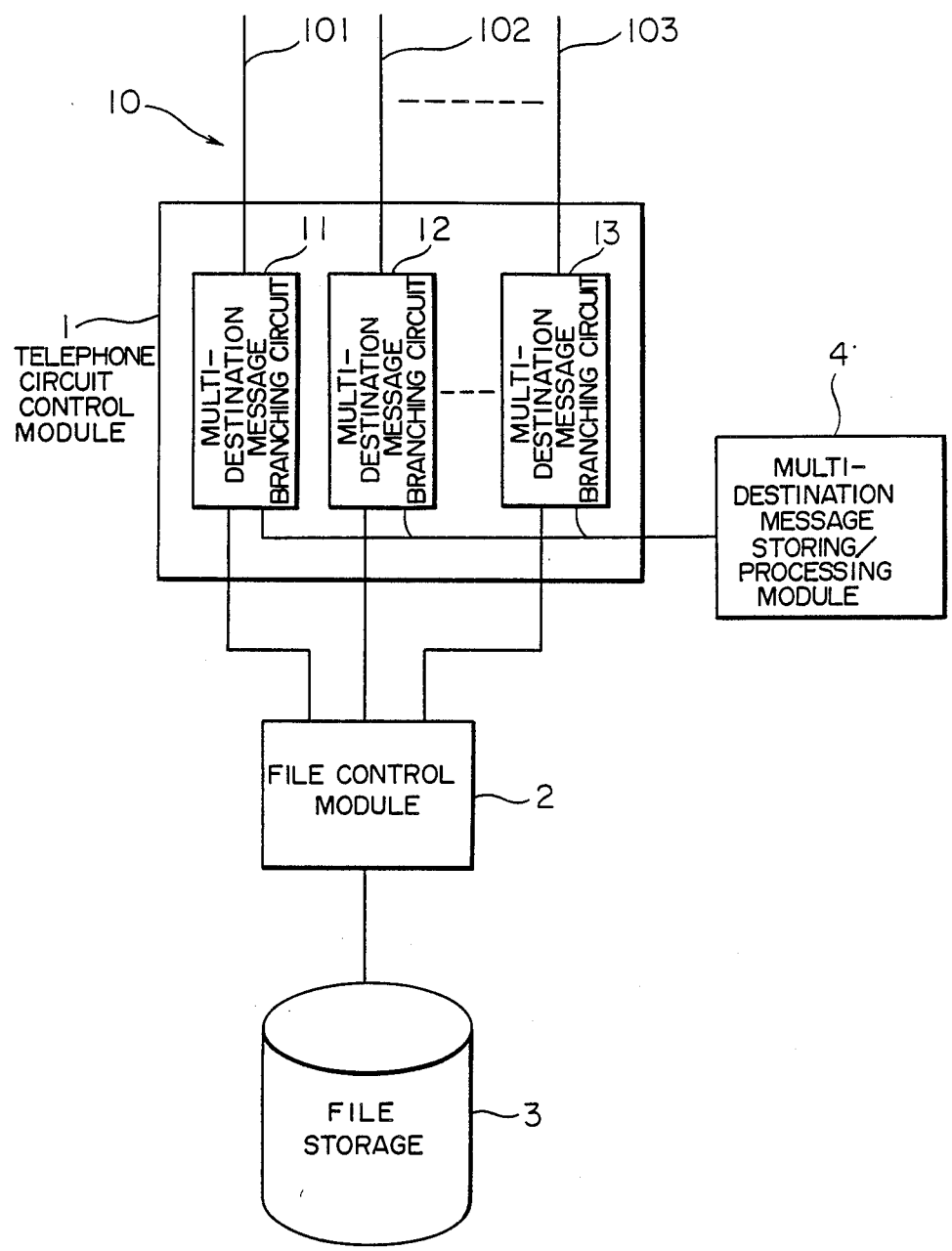
FIG. 4 is a block diagram schematically showing a packet storage/exchange node according to an embodiment of the invention.

Referring to FIG. 4, there is illustrated a package storage/exchange node according to an embodiment of this invention. The node comprises a line control module 1, a file control module 2, a file storage 3 and a multi-destination message storing/processing module 4. The line control module 1 includes multi-destination message branching circuits 11, 12 and 13 respectively connected with telephone lines 101, 102 and 103 of a subscriber circuit 10.

A message, containing either a single destination message or a multi-destination message and received in a transmission unit from, for example, the line 101 is supplied to the multi-destination message branching circuit 11 included in the line control module 1. The multi-destination message branching circuit 11 reads and detects a header in the input message. When the input message is detected to be a single destination message, the multi-destination message branching circuit 11 transfers this single destination message directly to the file control module 2. On the other hand, when the input message is a multi-destination message, the multi-destination message branching circuit 11 transfers this multi-destination message to the multi-destination message storing/processing module 4 and at the same time informs the line 101 that it is temporarily disabled for reception. Concurrently with initiation of the multi-destination message reception, the multi-destination message storing/processing module 4 sets a multi-destination message reception inhibiting level signal into each of the multi-destination message branching circuits 11 to 13. These circuits 11 to 13 are thus held in multi-destination message reception inhibiting conditions, except for the circuit 11 which has already started receiving the multi-destination message. In response to another multi-destination message the reception inhibited circuits transmit, to the associated lines, a disconnection instruction or an affirmation waiting response. The "disconnection instruction" is issued from the line control module to the associated line to inform the line that the line control module refuses to acknowledge the receipt of multi-destination messages. The "affirmation waiting response" is also issued from the line control module to the associated line to instruct the line to wait until an affirmative signal indicates that the line control module is now ready for acknowledging the receipt of multi-destination messages.

After completion of the transfer of the multi-destination message to the multi-destination message storing/processing module 4, the multi-destination message branching circuit 11 to transmits a disconnection instruction or an affirmation waiting response to the line 101.

Under this condition, the multi-destination storing/processing module 4 temporarily stores a message in the multi-destination message and temporarily transfers delivery destination addresses from a header in the multi-destination message to a memory area. Thereafter it expands the multi-destination message into individual single destination delivery messages by preparing individual message headers, the number of which is equal to that of individual delivery destination addresses, and adding the stored message to the individual message headers. The thus expanded individual single destination delivery messages for all deliveries are sequentially transferred in units of one message to the file control module 2 through the multi-destination message branching circuit 11. Upon completion of the expansion and transmission of the temporarily stored messages for all the addresses, the multi-destination message storing/processing module 4 releases the multi-destination message branching circuits 11 to 13 from the multi-destination message reception inhibiting signal previously set therein.

Figure 5:
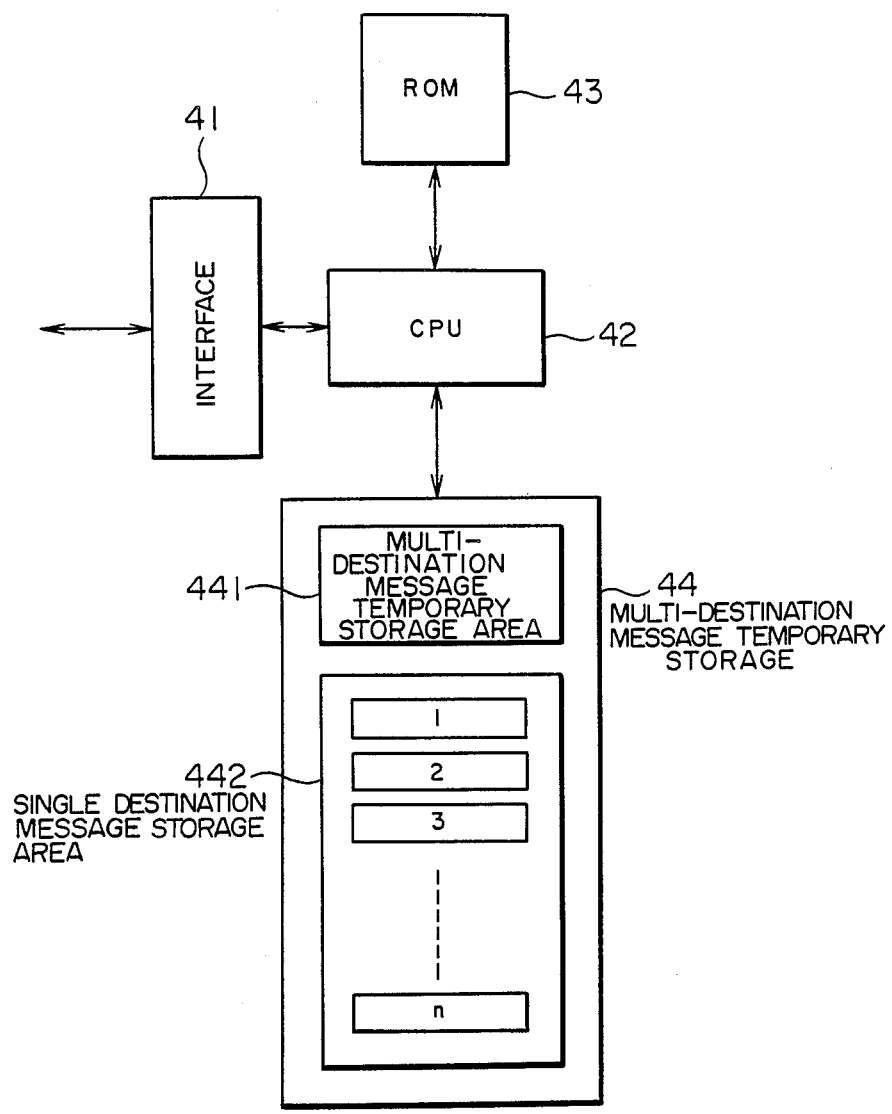
FIG. 5 is a block diagram schematically showing a multi-destination message storing/processing module used in the node of FIG. 4.

The multi-destination message storing/processing module 4 may be materialized readily by using, for example, microcomputer architecture. FIG. 5 illustrates a structural example of multi-destination message storing/processing module 4 comprising an interface 41 coupled to the multi-destination branching circuits, a central processing unit (CPU) 42, a program memory (ROM) 43 and a data memory (RAM) 44 serving as the multi-destination message temporary storage. In the RAM 44, the multi-destination message is stored in a multi-destination message temporary storage area 441 and the stored message is divided into individual single destination messages (1), (2), (3), . . . (n) which in turn are stored in a single destination message storage area 442, under the control of the CPU 42.

More particularly, when receiving a multi-destination message from one of the multi-destination message branching circuits 11 to 13 through the interface 41, the CPU 42 operates to temporarily store the multi-destination message in the multi-destination message temporary storage area 441 of the RAM 44 and subsequently, to expand the stored multi-destination message into individual single destination delivery messages (1), (2), (3), . . . (n) the number of which is equal to that of individual delivery addresses designated by a header in the multi-destination message and set the expanded messages (1), (2), (3), . . . (n) in the single destination message storage area 442. Thereafter, the CPU 42 operates to sequentially read the expanded individual single destination delivery messages in units of one message and return them to that multi-destination message branching circuit through the interface 41. The CPU 42 also operates to transmit a multi-destination message reception inhibiting level signal to each of the multi-destination message branching circuits 11 to 13 when it receives the multi-destination message and to release the multi-destination message branching circuits 11 to 13 from the multi-destination message reception inhibiting level signal when the transmission of all of the individual single destination delivery messages in the single destination message storage area 442 has been completed. The CPU 42 executes a series of processings pursuant to a program stored in the ROM 43.

Figure 6:
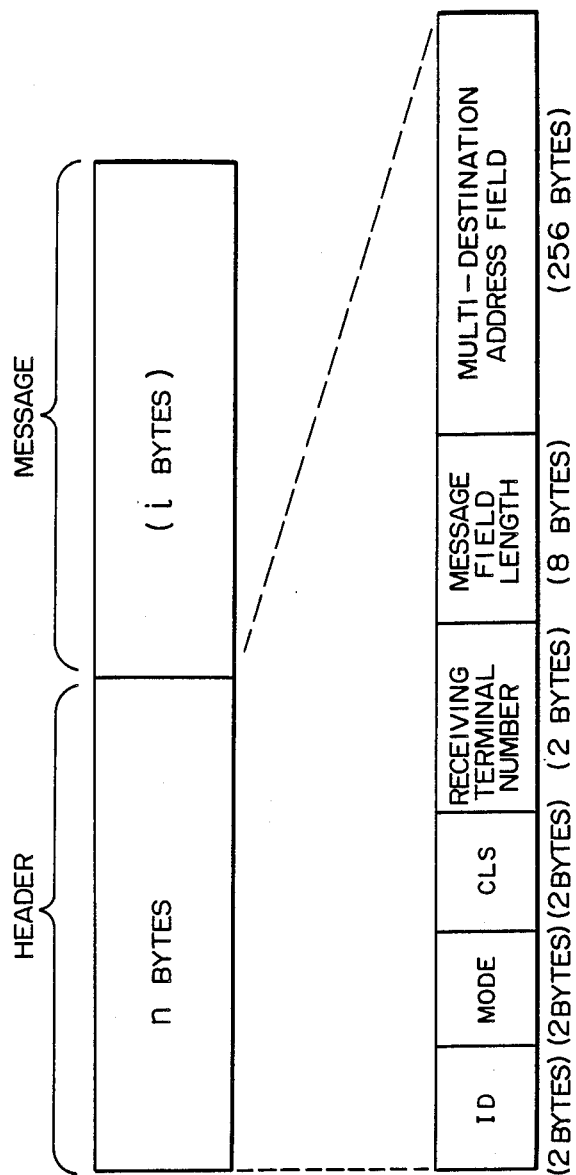
FIG. 6 illustrates a format of single destination message and multi-destination message.

An example of a message format is illustrated in FIG. 6. The message format has a header of n bytes and a message of i bytes, the header being detailed in FIG. 6. The header includes an ID of two bytes for indentification of the type of message such as a transmission message, a response message or a control message; a MODE of two bytes indicative of the mode of communications; a CLS of two bytes for identification of the grade of communication class such as an express communication or an ordinary communication; a receiving terminal number of two bytes for identification of either a single destination delivery or a multi-destination delivery; a message field length of eight bytes for prescribing the length of a multi-destination address field; and a multi-destination address field of 256 bytes.

Figure 7:
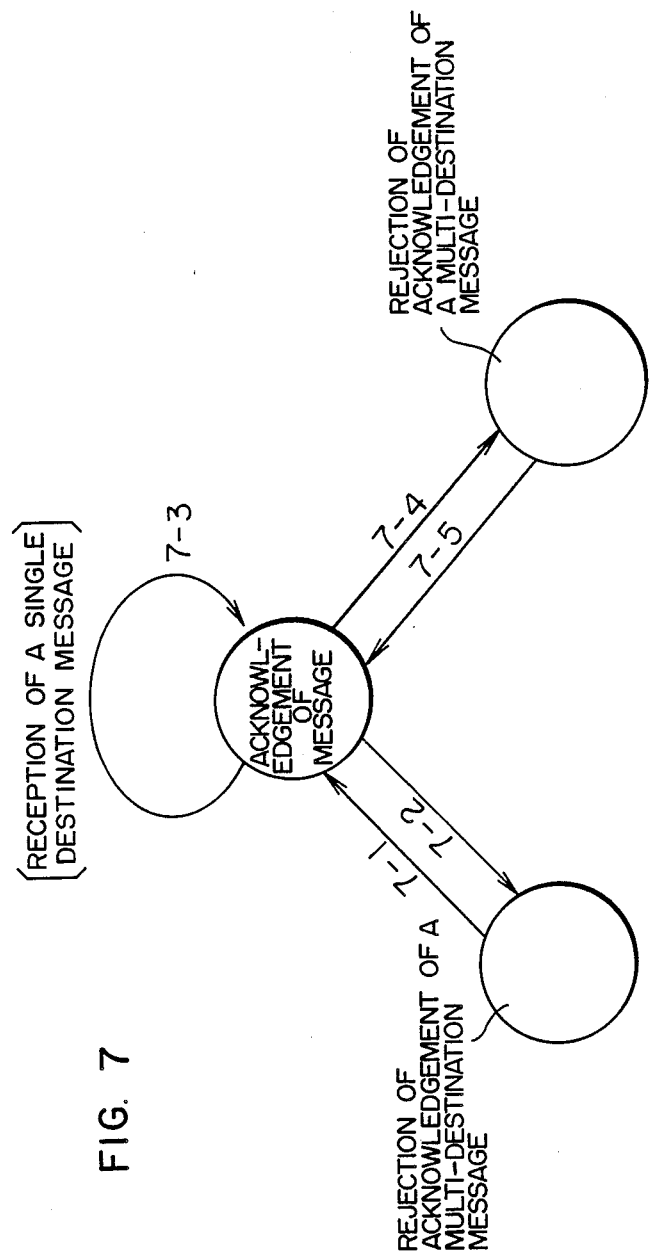

FIG. 7 shows a diagram useful to explain the operational state of the multi-destination message branching circuit as viewed from the subscriber. Table I describes the events in the operation.

Figure 8:
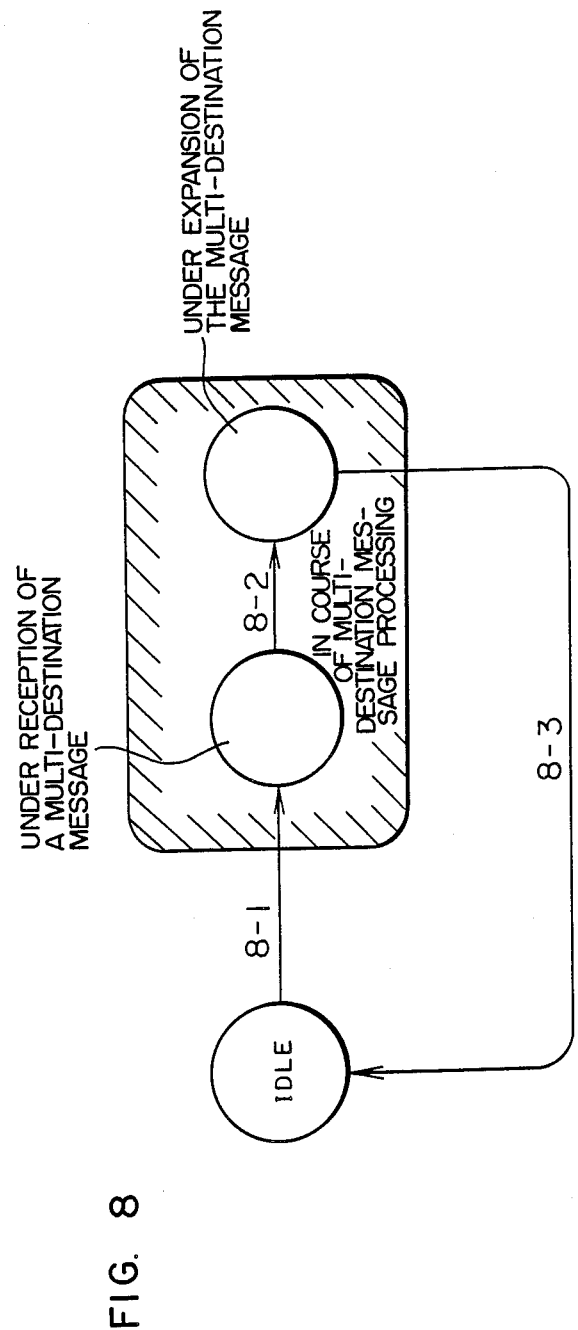

FIG. 8 shows a diagram useful to explain the operational state of the multi-destination message temporary storage as viewed from the multi-destination message branching circuit. Table II describes events in the operation according to FIG. 8.

FIG. 9 shows a diagram for explaining the operational state of the multi-destination message branching circuit as viewed from the multi-destination message temporary storage. Table III is an event table which corresponds to FIG. 9.

FIG. 10 shows a diagram for explaining the operational state of the file control module as viewed from the multi-destination message branching circuit. Table IV is an event table which corresponds to FIG. 10.

Figure 11:
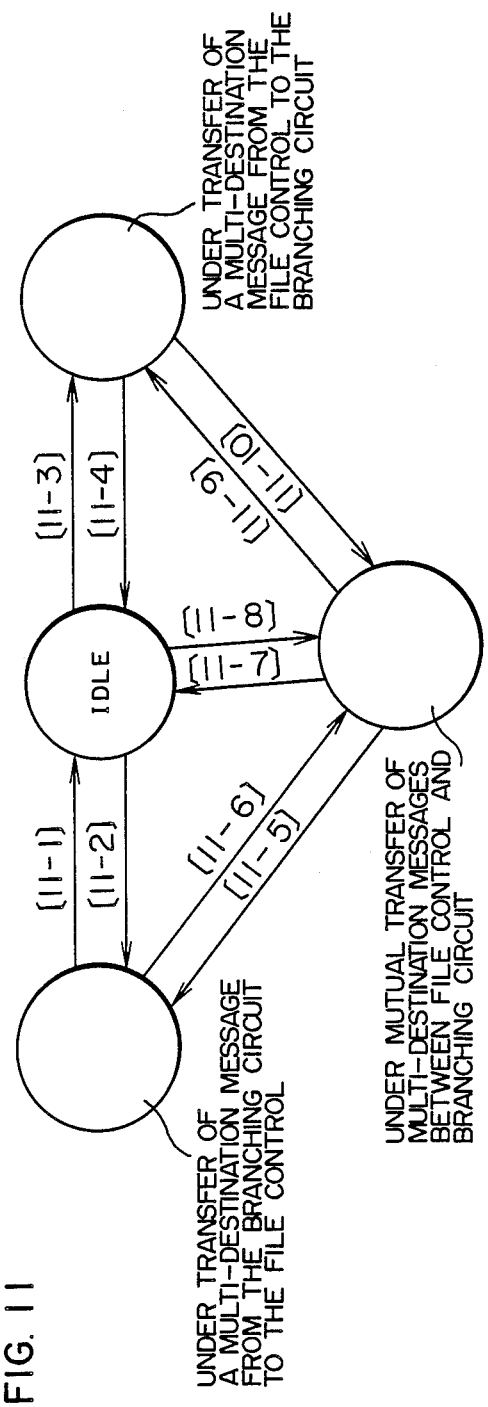

FIG. 11 shows a diagram for explaining the operational state of the multi-destination message branching circuit as viewed from the file control module. Table V is an event table corresponding to FIG. 11.

Figure 12:
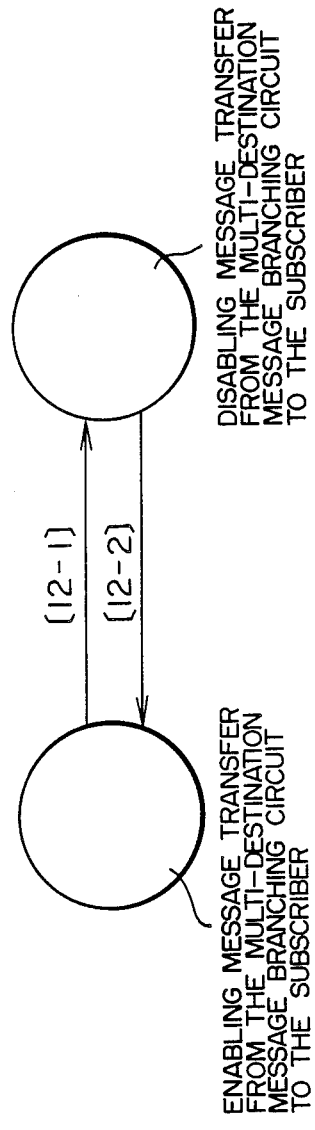

FIG. 12 shows a diagram for explaining the operational state of the subscriber circuit as viewed from the multi-destination message branching circuit. Table VI is an event table corresponding to FIG. 12.

Table I describes state transition events in the muilti-destination message branching circuit as viewed from the subscriber circuit as shown in FIG. 7 and is as follows.

| Event number | Events | Event Originator Subscriber | Other than subscriber |
|---|---|---|---|
| 7-1 | Setting of a multi-destination message acknowledgement rejection (disconnection) directed from the multi-destination message storing/processing module to the multi-destination message branching circuit is released. | | O |
| 7-2 | A multi-destination message acknowledgement rejection (disconnection) directed from the multi-destination message storing/processing module to the multi-destination message branching circuit is set. | | O |
| 7-3 | A single destination message is received from the subscriber circuit. | O | |
| 7-4 | A multi-destination message is received from the subscriber circuit. | O | |
| 7-5 | Setting of a multi-destination message acknowledgement rejection (disconnection) directed from the multi-destination message storing/processing module to the multi-destination message branching circuit is released. | | O |

Table II describes state transition events in the multi-destination message temporary storage as viewed from the multi-destination message branching circuit as shown in FIG. 8 and is as follows.

| Event number | Events | Event Originator Branching circuit | Other than branching circuit |
|---|---|---|---|
| 8-1 | The multi-destination message temporary storage starts receiving a multi-destination message from the multi-destination message branching circuit. | O | |
| 8-2 | Temporary storage of the multi-destination message is completed. | | O |
| 8-3 | Setting of a multi-destination message acknowledgement rejection (disconnection) directed from the multi-destination message storing/processing module to the multi-destination message branching circuit is released. | | O |

Table III describes state transition events in the multi-destination message branching circuit as viewed from the multi-destination message temporary storage as shown in FIG. 9 and is as follows.

| Event Number | Events | Event Originator Temporary storage | Other than temporary storage |
|---|---|---|---|
| 9-1 | The multi-destination message branching circuit receives a multi-destination message from the subscriber circuit. | | O |
| 9-2 | A multi-destination message acknowledgement rejection (disconnection) directed from the multi-destination message storing/processing module to the multi-destination message branching circuit is set. | O | |
| 9-3 | Setting of a multi-destination message acknowledgement rejection (disconnection) directed from the multi-destination message storing/processing module to the multi-destination message branching circuit is released. | | |

Table IV describes state transition events in the file control module as viewed from the multi-destination message branching circuit as shown in FIG. 10 and is as follows.

| Event Number | Events | Event Originator Branching circuit | Other than branching circuit |
|---|---|---|---|
| 10-1 | Completion of message transfer from multi-destination message branching circuit to file control module. | O | |
| 10-2 | Start of message transfer from multi-destination message branching circuit to file control module. | O | |
| 10-3 | Start of message transfer from file control module to multi-destination message branching circuit. | | O |
| 10-4 | Completion of message trans- | | O |

-continued

| Event Number | Events | Event Originator | |
|---|---|---|---|
| | | Branching circuit | Other than branching circuit |
| | fer from file control module to multi-destination message branching circuit. | | |
| 10-5 | Completion of message transfer from multi-destination message branching circuit to file control module. | O | |
| 10-6 | Start of message transfer from multi-destination message branching circuit to file control module. | O | |
| 10-7 | Completion of message transfer from file control module to multi-destination message branching circuit. | | O |
| 10-8 | Start of message transfer from file control module to multi-destination message branching circuit. | | O |
| 10-9 | Simultaneous completion of mutual transfer of messages between multi-destination message branching circuit and file control module. | O | O |
| 10-10 | Simultaneous start of mutual transfer of messages between multi-destination message branching circuit and file control module. | O | O |

Table V describes state transition events in the multi-destination message branching circuit as viewed from the file control module as shown in FIG. 11 and is as follows.

| Event Number | Events | Event Originator | |
|---|---|---|---|
| | | File control | Other than file control |
| 11-1 | Completion of message transfer from multi-destination message branching circuit to file control module. | | O |
| 11-2 | Start of message transfer from multi-destination message branching circuit to file control module. | | O |
| 11-3 | Start of message transfer from file control to multi-destination message branching circuit. | O | |
| 11-4 | Completion of message transfer from file control to multi-destination message branching circuit. | O | |
| 11-5 | Completion of message transfer from file control to multi-destination message branching circuit. | O | |
| 11-6 | Start of message transfer from file control module to multi-destination message branching circuit. | O | |
| 11-7 | Simultaneous completion of mutual transfer of messages between multi-destination message branching circuit and file control module. | O | O |
| 11-8 | Simultaneous start of mutual transfer of messages between multi-destination message branching circuit and file control module. | O | O |
| 11-9 | Completion of message tranfer from multi-destination message branching circuit to file control module. | | O |
| 11-10 | Start of message transfer from multi-destination message branching circuit to file control module. | | O |

Table VI describes state transition events in the subscriber circuit as viewed from the multi-destination message branching circuit as shown in FIG. 12 and is as follows.

| Event Number | Events | Event Originator | |
|---|---|---|---|
| | | Branching circuit | Other than branching circuit |
| 12-1 | Troubles in subscriber system or power turn-off. | | O |
| 12-2 | Recovery of subscriber system from troubles or power turn-on. | | O |

Figure 13:
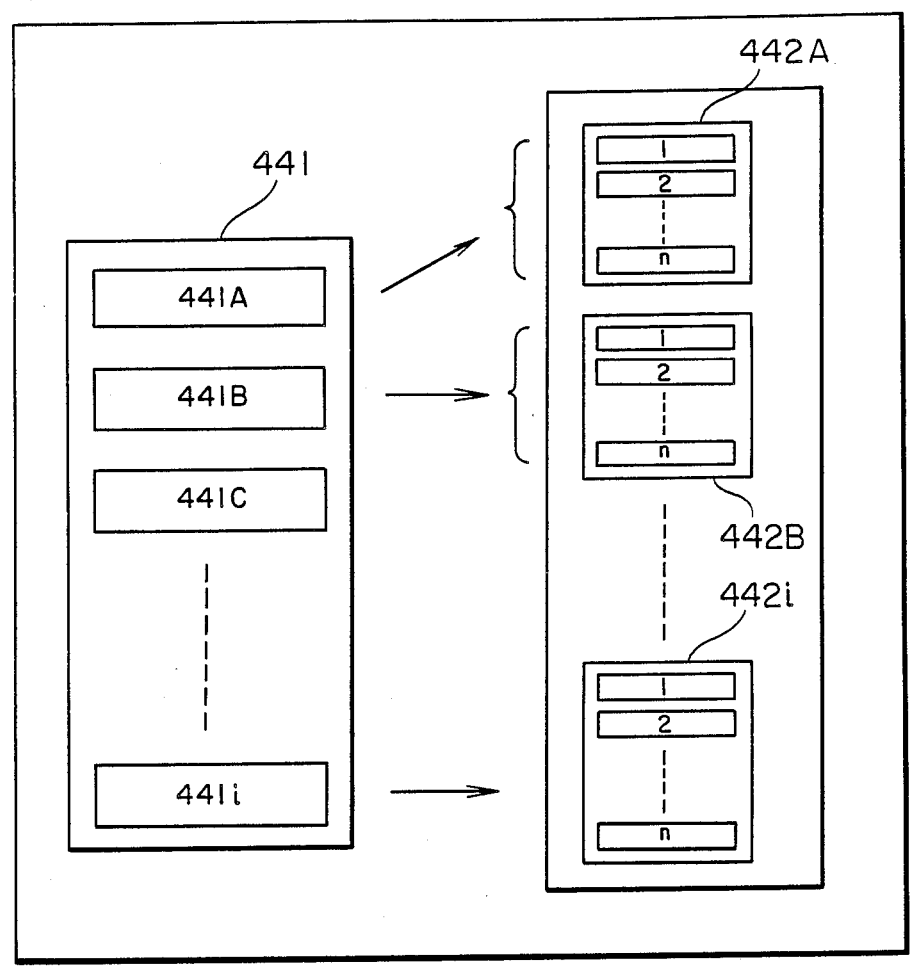
FIG. 13 is a schematic diagram showing another embodiment of a multi-destination message temporary storage shown in FIG. 5.

FIG. 13 illustrates another embodiment of the multi-destination message temporary storage 44 shown in FIG. 5. A multi-destination message temporary storage 44A in FIG. 13 is a RAM and has a multi-destination message temporary storage area 441 comprised of a plurality of areas 441A, 441B, 441C, . . . 441i and a plurality of single destination delivery message storage areas 442A, 442B, . . . 442i provided in correspondence to the multi-destination message temporary storage areas 441A, 441B, . . . 441i. The RAM 44A operates similarly to the RAM 44 explained with reference to FIGS. 5 and 8.

The capacity of multi-destination message reception can be increased using the RAM 44A as shown in FIG. 13 and hence the occurrence of the reception inhibition is less frequent to promote services offered to the subscriber.

As has been described, according to the present invention, a multi-destination message from the telephone subscriber line or trunk line can be once absorbed by the multi-destination message temporary storage and after expansion of the multi-destination message, expanded individual single destination delivery messages can be processed message by message at the file control module, thereby preventing the file control module from being applied with an excessive load in the form of expanded individual single destination delivery messages whose number exceeds the upper limit of the number of messages that can be processed by the file control module. This makes it possible to eliminate operational congestion in the file control module otherwise caused by the load of the expanded individual single destination delivery messages at any time in course of processing of messages from a plurality of packet terminals and to exclude the disconnection instruction from being produced to the subscriber lines by the occurrence of operational congestion. Accordingly, interference between packet terminals due to a bottleneck in node performance during expansion of multi-destination messages can be eliminated completely.

I claim:

1. An apparatus for multi-destination communication processing in a packet storage/exchange node comprising:
   a line control module for controlling transmission and reception of a message containing either a single destination message or a multi-destination message to and from a telephone line;
   a file storage for storing said message in accordance with delivery destination addresses;
   a file control module for controlling writing said message received from said line control module into said file storage and reading said message from said file storage to supply said message to said line control module; and
   a multi-destination message storing/processing module including a multi-destination message temporary storage having at least one multi-destination message temporary storage area for temporarily storing said multi-destination message and at least one single destination message storage area for storing individual single destination messages expanded from said multi-destination message.

2. A multi-destination communication processing apparatus according to claim 1 wherein said line control module includes at least one multi-destination message branching circuit, said multi-destination message branching circuit comprising:
   means for detecting whether said message is a single destination message or a multi-destination message;
   means for transferring said message to said file control module when said means for detecting determines that said message is a single destination message; and
   means for transferring said message to said multi-destination message storing/processing module when said means for detecting determines that said message is a multi-destination message.

3. A multi-destination communication processing apparatus according to claim 1 wherein said multi-destination message storing/processing module further comprises a central processing unit (CPU), a read only memory (ROM) and an interface.

4. A multi-destination communication processing apparatus according to claim 2 wherein said multi-destination message branching circuit transmits to said telephone line a disconnection instruction signal or an affirmation waiting response signal when said multi-destination message is received.

5. A method for multi-destination communication processing in a packet storage/exchange node comprising the steps of:
   controlling transmission and reception of a message containing either a single destination message or a multi-destination message to and from a telephone line by means of a line control module;
   storing said message in accordance with delivery destination addresses by means of a file storage;
   writing said message received from said line control module into said file storage;
   reading said message from said file storage to supply said message to said line control module;
   temporarily storing said multi-destination message supplied from said line control module;
   expanding said temporarily stored multi-destination message in accordance with single destination deliveries and storing expanded individual single destination messages in a single destination message storage area.

6. A multi-destination communication processing method according to claim 5 further comprising the steps of:
   deciding at said line control module whether said message is a single destination message or a multi-destination message;
   transferring said single destination message to said file storage; and
   transferring said multi-destination message to means for temporarily storing said multi-destination message.

7. A multi-destination communication processing method according to claim 6 further comprising the step of transmitting to said telephone line a disconnection instruction signal or an affirmation waiting response signal when said multi-destination message is received and processed.

* * * * *